May 30, 1939.  H. C. WILLIAMSON  2,160,609
REFRIGERATING DEVICE
Filed May 5, 1937  7 Sheets-Sheet 1

Inventor:
Henry C. Williamson
By Chitton, Weber, Davies, Hirschl & Dawson
Attorneys

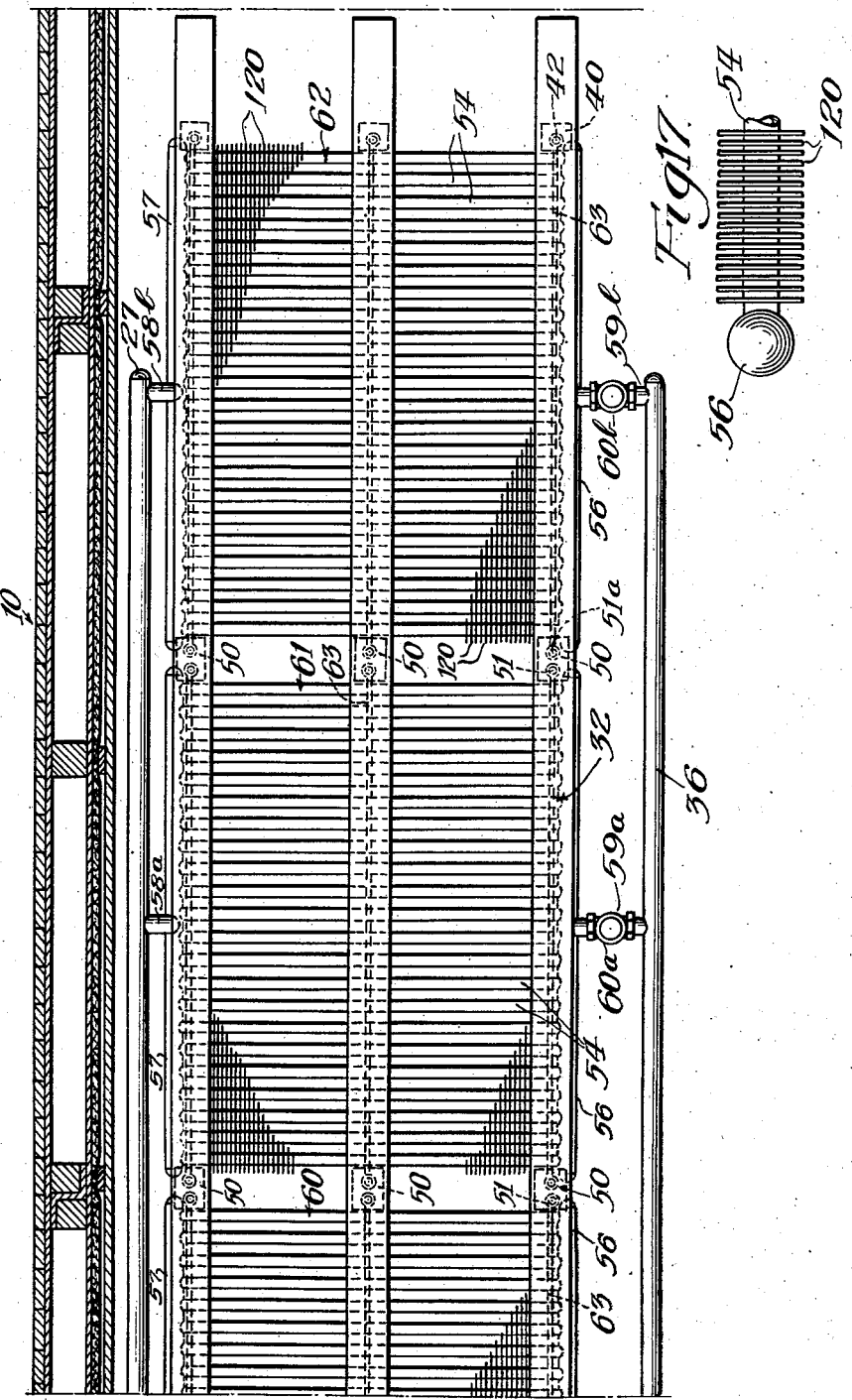

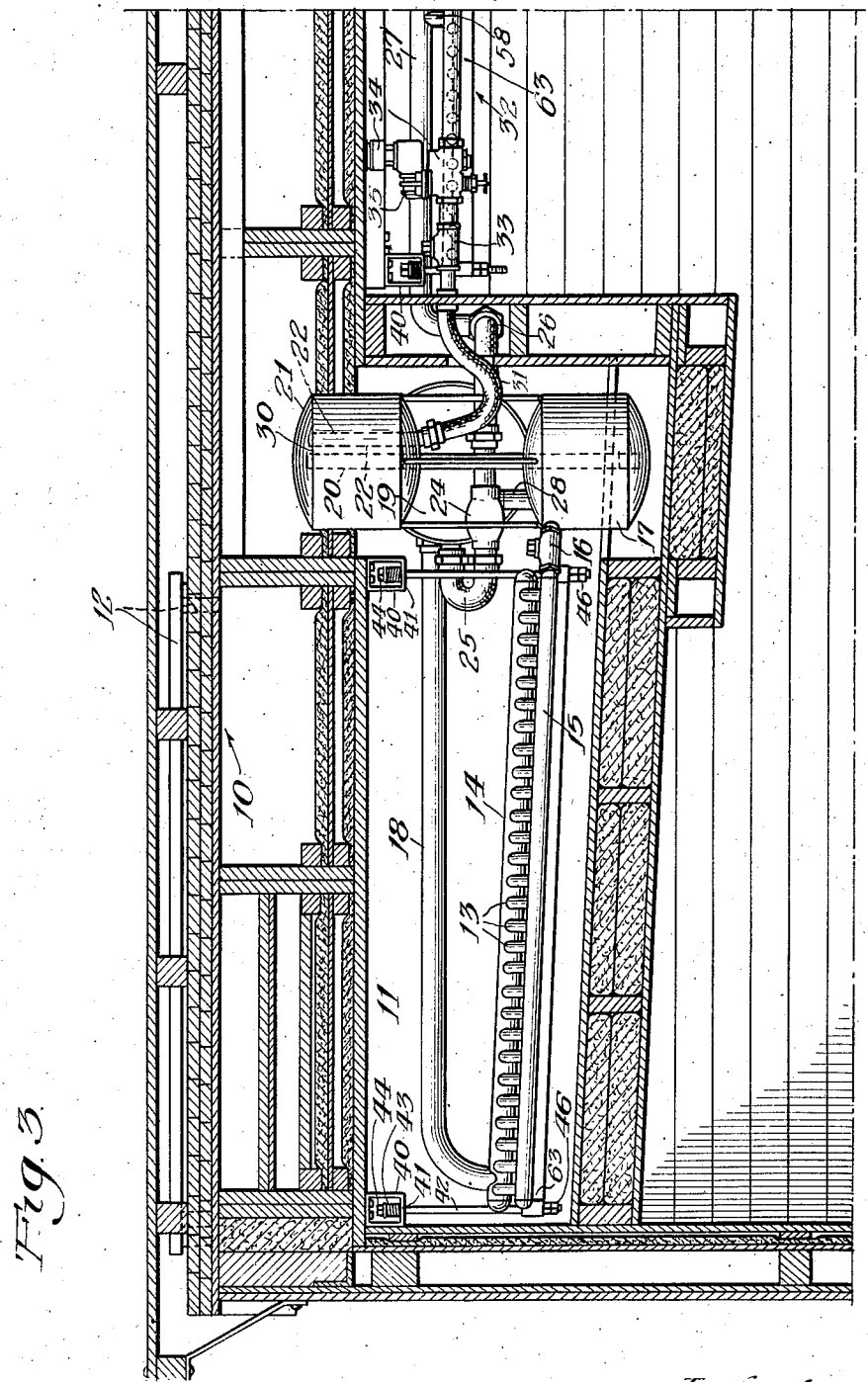

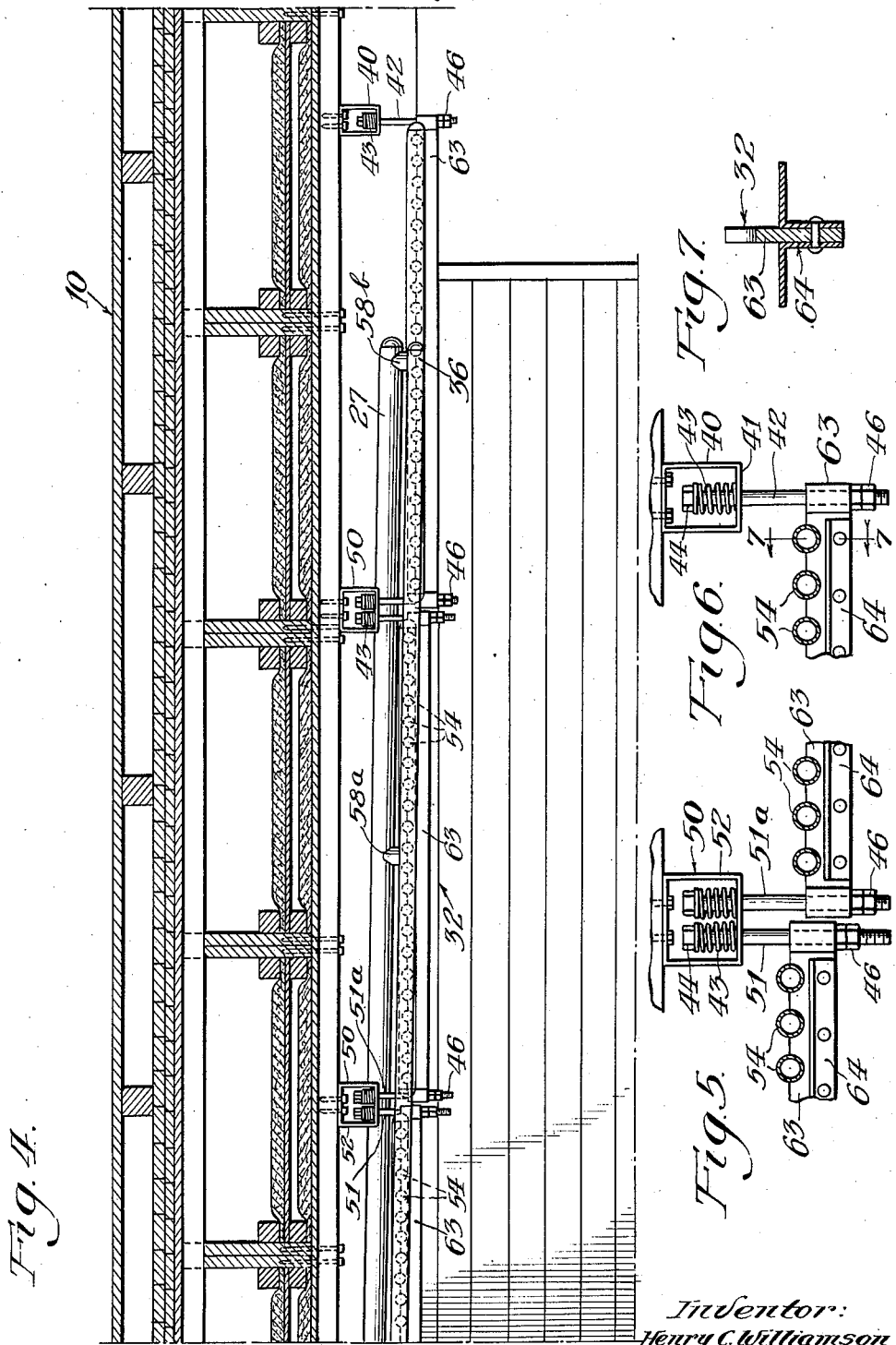

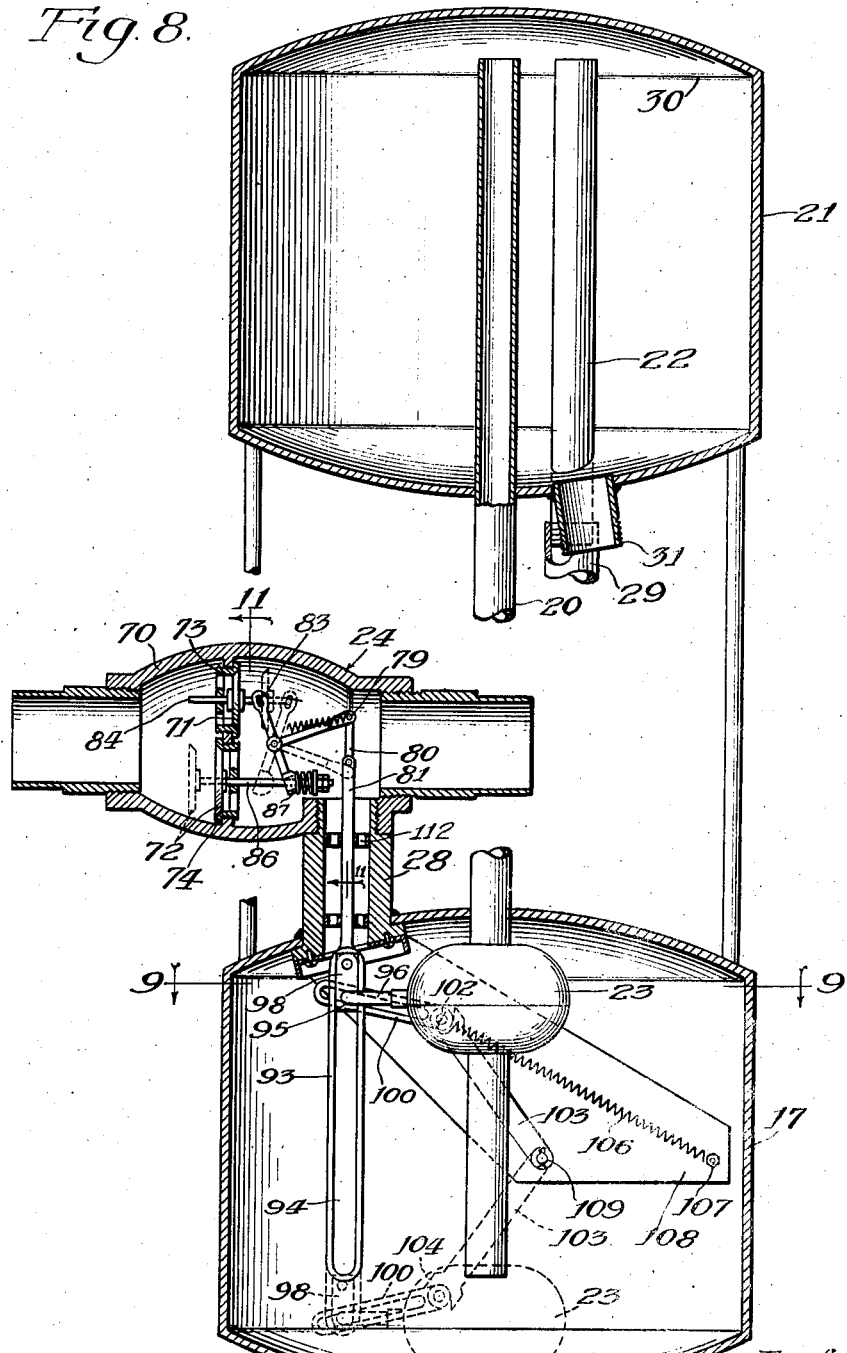

May 30, 1939.  H. C. WILLIAMSON  2,160,609
REFRIGERATING DEVICE
Filed May 5, 1937  7 Sheets—Sheet 6

Inventor:
Henry C. Williamson,
By Attorneys:

May 30, 1939.   H. C. WILLIAMSON   2,160,609
REFRIGERATING DEVICE
Filed May 5, 1937   7 Sheets-Sheet 7
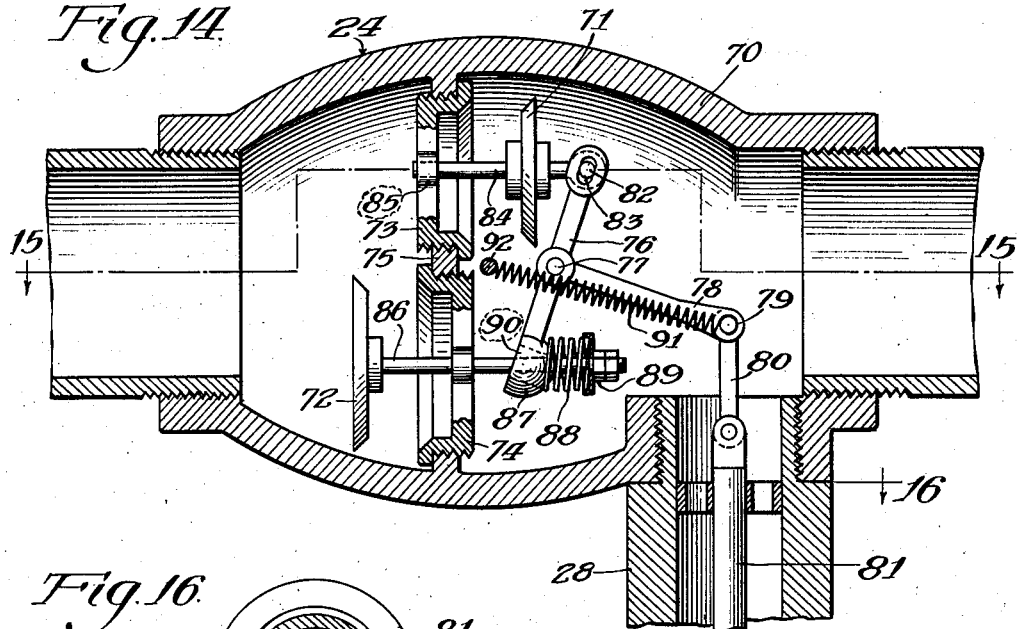
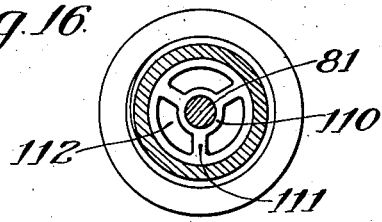
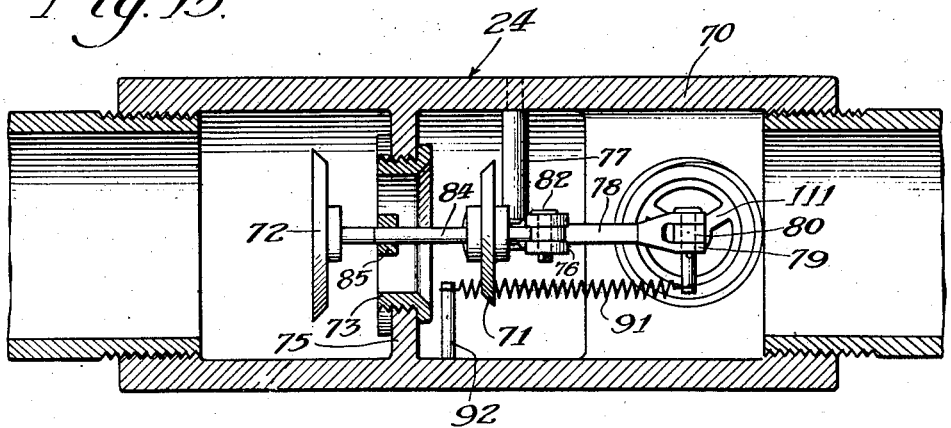
Inventor:
Henry C. Williamson.
By Chittor, Wiles, Davies, Hirschl & Dawson
Attorneys Patented May 30, 1939

2,160,609

UNITED STATES PATENT OFFICE 2,160,609

REFRIGERATING DEVICE

Henry C. Williamson, Chicago, Ill., assignor to Charles B. White, New York, N. Y., and Fred G. Hoblitzell, Toronto, Ontario, Canada, jointly as trustees Application May 5, 1937, Serial No. 140,908

10 Claims. (Cl. 62—91.5)

This invention relates to a refrigerating device and more particularly to a refrigerating system employing a primary refrigerant such as solid carbon dioxide in combination with a volatile secondary refrigerant circulating throughout a system.

The invention is particularly adapted to use in large installations such as refrigerator cars, in which it is highly desirable that no mechanical adjustments be required and that the entire system be inherently automatic.

Systems of this type have been suggested, but the completely automatic ones are subject to the defect that they depend for their power entirely upon gravity, and this is not great enough in such a system to produce adequate cooling means under all conditions.

In the present system power is obtained from the solid carbon dioxide and the temperature of the system to be refrigerated to provide adequate forced feeding of the secondary refrigerant.

Figure 1:
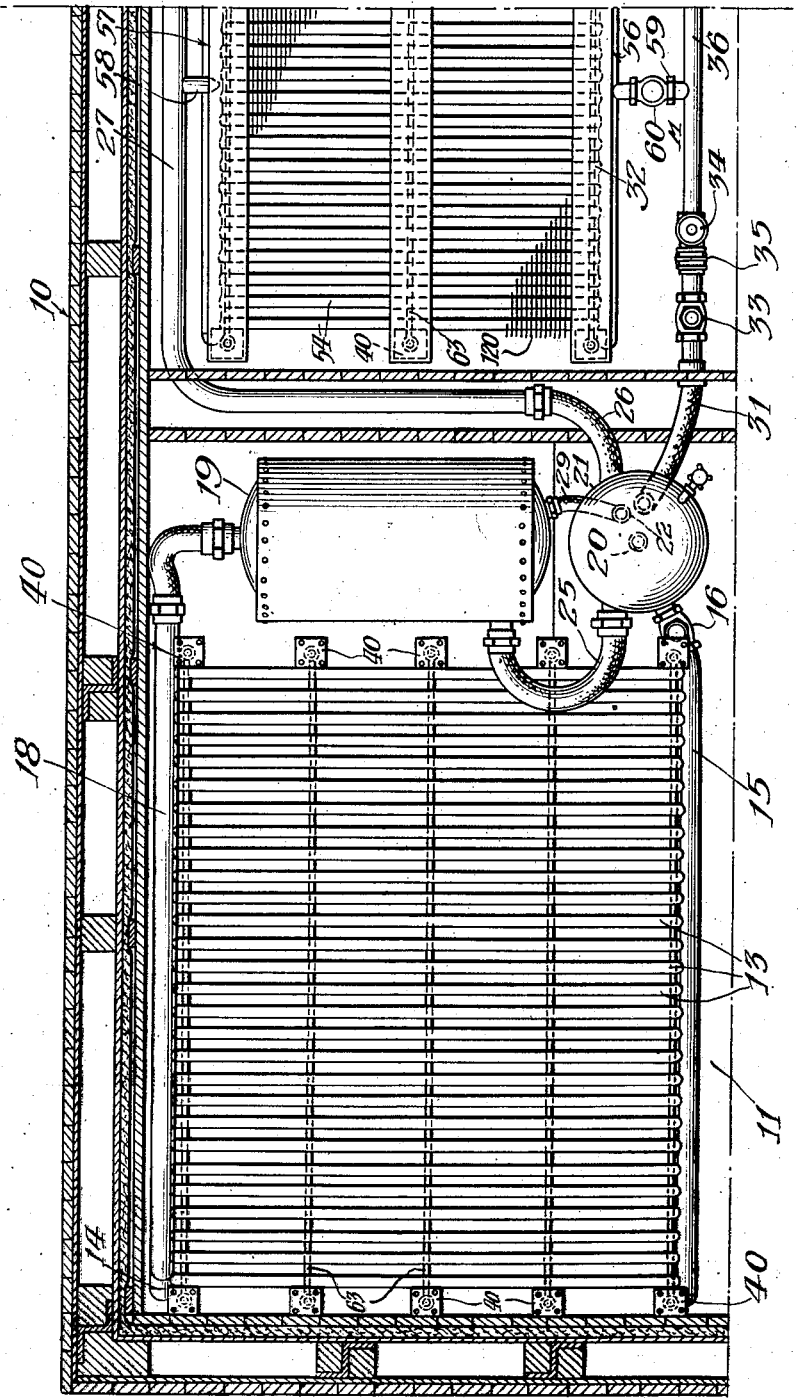
Figure 9:
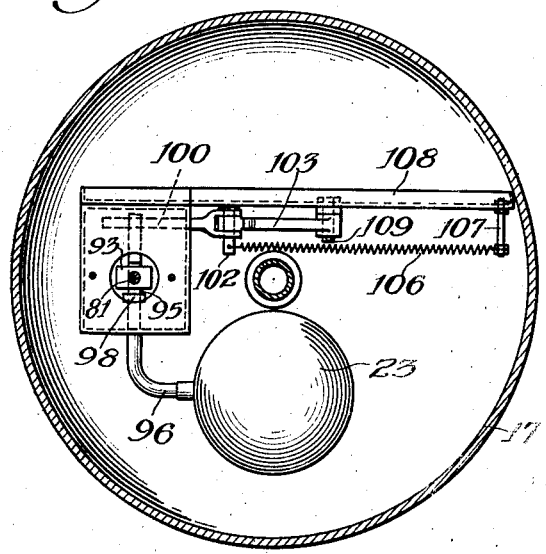
Figure 10:
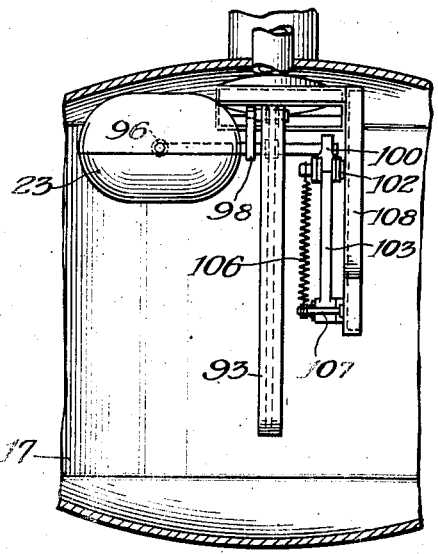
Figure 11:
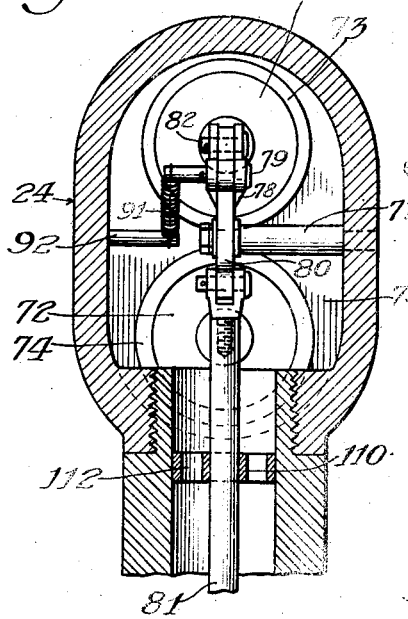
Figure 12:
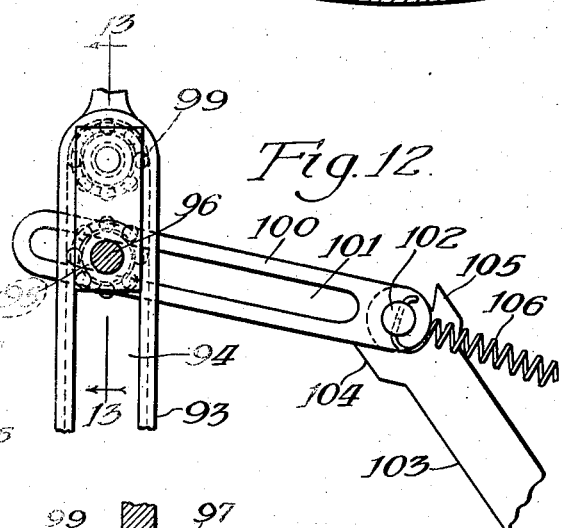
Figure 13:
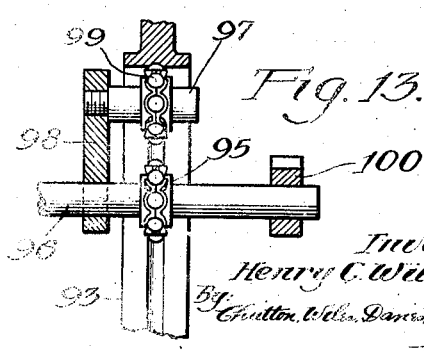

The invention is illustrated in the drawings, in which Fig. 1 is a plan view, in section, showing a refrigerator car in which the system has been incorporated; Fig. 2 is an extension of Fig. 1, the right-hand side of Fig. 1 being the left-hand side of Fig. 2; Fig. 3 is a vertical section through the car and corresponds with Fig. 1; Fig. 4 is a similar view corresponding to Fig. 2; Fig. 5 is a detailed sectional elevation of the duplex spring suspension; Fig. 6 is a corresponding section of a single spring suspension; Fig. 7 is a sectional view taken along the line 7—7 of Fig. 6; Fig. 8 is a vertical section taken longitudinally of the car through the float chamber and riser chamber; Fig. 9 is a sectional plan through the float chamber; Fig. 10 is a vertical section taken transversely of the car through the float chamber; Fig. 11 is a vertical transverse section through the float valve; Fig. 12 is an elevation partly in section of a portion of the float valve 7 mechanism; Fig. 13 is a vertical section taken along the line 13 in Fig. 12; Fig. 14 is a longitudinal sectional view of the float valve; Fig. 15 is a vertical section along the line 15 of Fig. 14; Fig. 16 is a cross-sectional plan view along the line 16 of Fig. 14; Fig. 17 is a detailed view of the cooling fins viewed in transverse elevation.

The device is illustrated in combination with a refrigerating car, but its application is by no means limited to such a structure. Car 10 having customary top and side walls preferably insulated is provided preferably in each of the four top corners with a bunker 11 for incorporation of dry ice, to which access may be had through opening 12. Within the bunker, and lining its bottom is a series of condenser pipes 13 connected to manifolds 14 and 15. Manifold 15 is connected through a check valve 16 with the float chamber 17. Manifold 14 connects through the line 18 with the tank 19.

Connecting the float chamber 17 and the riser or distributing chamber 21 is a pipe 20 through which liquid rises from the lower to the upper tank. Likewise in the riser chamber is a pipe 22 from which vapors in the upper chamber are vented to the tank 19 and thence to the condensers. Within the float chamber is positioned a float 23 operatively connected to float valve 24 which controls the flow of vapors into the condenser. The chamber 19 is connected to the valve 24 by line 25. This line is extended as 26 on the opposite side of the valve and leads to the evaporator manifold 27. Float chamber 17 is connected to the valve 24 through the well 28.

Chamber 19 is connected to the riser chamber 21 through line 29 which extends within the chamber 21, above the liquid line as indicated at 30.

Line 31 leads from the riser tank to the evaporator 32 through the check valve 33 and the thermostatic valve 34 controlled by thermostat 35. Valve 34 is connected with the manifold 36 which is in turn connected to the evaporating or cooling coils 32.

Inasmuch as the entire system must be kept gas-tight and there are a great number of connections, it is important that the system be suspended in a manner where it will not be affected by warpage of the car or by any distortion of the car in movement or otherwise. It is therefore preferred, as shown in Figs. 3 to 7 inclusive, to suspend the system upon a spring suspension. The spring suspension comprises a bracket 40 rigidly fixed within the car and forming a yoke 41 through which the rod 42 is suspended. Within the yoke a coil spring 43 is mounted about the upper end of the rod 42 and adjustably held in place by the nut 44. The lower end of the rod 42 passes through an opening in the plate 63 and is there secured by the lock nuts 46. The plates 63 are stiffened by angles 64, which are refitted to the plates as shown in Figure 7.

As will be seen, a plurality of such spring mountings are provided on the condenser and provide universal movement therefor, inasmuch as the fitting of the rod 42 and the yoke 41 leaves a slight tolerance for movement in a horizontal plane. This movement should not be large, however, and it is preferred that the springs 43 be quite strong.

The evaporators are suspended similarly but preferably in sections as indicated in Figs. 2, 4 and 5. In this connection the adjoining sections are preferably mounted in a suspension 50 in which two rods 51 and 51a are mounted in a single yoke 52. Rod 51 is a suspending member for the left-hand section and 51a for the right-hand section of the evaporator coil as indicated. The evaporator coil comprises a great plurality of pipes 54 laid cross-wise of the car between the manifolds 56 and 57 which are connected to the manifolds 36 and 27 respectively through connections 58, 58a, 58b, 59, 59a and 59b respectively. In this manner the evaporator coils are divided into banks 60, 61 and 62, which may be individually shut off by valves 60, 60a and 60b. The pipes 54 are set in the vertical plates 63, which are suspended at their ends on the spring-mounted rods.

Float valve 24 is operated by the float 23 through the mechanism which will now be described. Within the shell 70 of the float valve 24 are mounted two compensating valves 71 and 72 seating in valve seats 73 and 74 mounted in the wall 75.

As best shown in Fig. 14, the valves are pivotally mounted at opposite ends of the arm 76 of the lever 78 which is pivotally mounted at 77. The lever 78 is pivotally mounted at 79 on pivot arm 80 carried by the plunger 81. The lug 82 on the valve 71 is carried in a slot 83 in the toggle arm 76, thereby providing lost motion to prevent distortion of the valve 71. A plunger 84 is carried by the valve 71 and fits loosely in the opening 85 in the valve seat.

The valve 72 is supplied with a valve rod 86 which is mounted in the head 87 of the toggle arm 76 by means of the springs 88 and the adjusting nuts 89.

It will be seen that both valves may be adjusted by adjustment of the nuts 89. The valve rod 86 has a lost motion connection with the toggle arm 76 by being very loosely seated in the opening 90. A spring 91 connected with the pivot 79 and having its other end knotted at 92 in line with the pivot 77 assists in providing snap action to the seating of the valves. The plunger 81 passes through the connection 28 and its lower end is provided with an enlargement 93 provided as an elongated slot 94, within which is positioned the bearing 95 carried by the arm 96 mounted on the float 23.

The plate 98 is likewise carried by the arm 95 which is journaled in the lower portion of the plate. A stud 97 is mounted in the upper portion of the plate 98 and extends within the slot 94 within which it is mounted on the ball bearing 99. The arm 96, after passing through the slot 94, engages arm 100 as shown in Fig. 13 and is positioned in the slot 101 in this arm.

The arm 100 is pivotally mounted at 102 on the pivot arm 103 which is provided with a pair of ears 104 and 105 which limit the motion of the arm 100 in either direction. A spring 106 under tension extends from the pivot 102 to the stud 107 mounted in the frame 108 within the float chamber.

The pivot arm 103 is mounted on the lug 109 likewise mounted in frame 108.

The plunger 81, in passing through the chamber 28, passes through the tube 110 carried by the ribs 111 which leave the spaces 112 for the passage of vapors through the conduit.

It will be seen from Fig. 8 of the drawings that when the float valve is in its upper position the plate 98 and the upper bearing 99 engage the upper end of the slot 94 and raise the plunger 81 thereby closing both valves 71 and 72. When in this position the float is held upwardly not only by the liquid in the chamber but by the action of the spring 106 on the toggle arrangement formed by arms 100 and 103. When the float tends to fall because of drop in the liquid level, the spring 106 resists this tendency during all of the drop of the float until the pivot 102 is in line with the pivots 109 and 107. Thereafter the spring acts increasingly to accelerate the downward movement of the float. In this manner energy is stored during the first half of the lost motion of the float to be used to the second half and thereby assists in overcoming any resistance of the valve to opening. When the float falls to its lowermost position the bearing 95 engages the lower end of the slot 94, lowering the plunger 81 and opening valves 71 and 72.

As shown in Fig. 17, a plurality of cooling fins 120 are employed throughout the evaporating system.

In the operation of the refrigerating system the secondary refrigerant may be introduced in any desired manner, the passages first having been freed from air. Dry ice is then introduced into the condensing chamber as through the bunker opening 12. Enough secondary refrigerant is placed in the system so that the float chamber 17 will be entirely full of liquid refrigerant. The dry ice in the bunker cools the condenser pipes 13, absorbing heat therefrom and reducing the pressure of the secondary refrigerant contained therein. At this stage of the process the float 17 is in its up position and float valve 24 is closed.

As the pressure is reduced in the condenser 13, liquid is formed therein and additional vapor is pulled into the condenser through the manifold 18 from the tank 19 and by reason of the pipe 22 connecting to tank 19 the pressure is likewise reduced in tank 21. At the same time check valve 16 is closed and thereupon, the pressure being lowered in tank 17, the liquid refrigerant in the latter tank rises and empties into tank 21. This operation gradually lowers the float valve 23 until ultimately the float valve 24 is snapped open. During the lowering of the float, vapors may enter the chamber through the conduit 28 to replace the liquid. Also the vapor pressure of the liquid itself will apply the needed pressure.

As soon as the valve 24 opens, pressure will equalize throughout the system, and liquid condensed in the evaporator tubes will flow through 15 and 16 to chamber 17. At the same time liquid will flow from tank 21 through line 31 and check valve 33 into the evaporator system, thus cooling the entire system. As rapidly as tank 17 becomes filled with liquid, this procedure repeats itself until the space to be refrigerated is of the desired temperature at which time thermostatic valve 34 closes and stops the cycle. When the temperature has risen the thermostatic valve opens again and the cycle may resume.

What I claim as new and desire to secure by Letters Patent is:

1. In a refrigerating device, a condenser, an evaporator communicating therewith, a container below the condenser, a check valve between the condenser and the container adapted to be closed when the pressure in the container is higher than in the condenser, a distributing chamber above said container and the evaporator, and communicating with the container by a passageway terminating near the bottom of said container, said distributing chamber communicating by another passageway with the evaporator, a valve controlling the communication between condenser and evaporator, and means controlled by the liquid in the container for opening and closing said valve.

2. The method of automatically circulating a volatile liquid refrigerant in a closed system which comprises cooling vapors of the refrigerant to produce a substantially lower pressure in one part of the system, while maintaining substantially higher vapor pressure of the refrigerant on a liquid body of said refrigerant in the system, forcing liquid from said body to a higher body of liquid solely by such pressure, evaporating so-elevated-liquid, condensing so-evaporated-gas, and passing it to said lower liquid body to renew the same.

3. In a refrigerating device, a condenser, an evaporator communicating therewith, a container below the condenser, a check valve between the condenser and the container adapted to be closed when the pressure in the container is higher than in the condenser, a distributing chamber above said container, and communicating therewith by a passageway terminating near the bottom of said container, said distributing chamber communicating by another passageway with the condenser, a valve controlling the communication between condenser and evaporator, means controlled by the liquid in the container for opening and closing said valve, said distributing chamber also communicating with the evaporator, and a check valve in said communication adapted to be closed when the pressure in the evaporator is higher than in the distributing chamber.

4. In a refrigerating device, a condenser, an evaporator communicating therewith, a container below the condenser, a check valve between the condenser and the container adapted to be closed when the pressure in the container is higher than in the condenser, a distributing chamber above said container, and communicating therewith by a passageway terminating near the bottom of said container, said distributing chamber communicating by another passageway with the condenser, a valve controlling the communication between condenser and evaporator, means controlled by the liquid in the container for opening and closing said valve, said distributing chamber also communicating with the evaporator, a check valve in said communication adapted to be closed when the pressure in the evaporator is higher than in the distributing chamber, and a thermostatic valve in said system for controlling the operation thereof.

5. The method of replenishing the volatile liquid refrigerant in an elevated body of such liquid to permit subsequent evaporation thereof in a closed system for refrigerating purposes, comprising providing a lower body of said liquid, connecting such bodies to permit the flow of liquid from said lower body to said elevated body, cooling the vapors of the refrigerant in a part of the system communicating with said elevated body to produce a relatively low pressure in such part of the system, and maintaining a substantially higher vapor pressure on such lower body of liquid to force such liquid from said lower body to said elevated body solely by such pressure.

6. In a refrigerating device, a condenser adapted to be cooled, an evaporator communicating therewith, a container arranged at a low point for receiving refrigerant from the condenser, and means operated by changes in the pressure differential between the condenser and the evaporator for raising liquid from the container to a distributor arranged above and in communication with the evaporator.

7. A refrigerating device as set forth in claim 6, in which the means operated by the changes in the pressure differential acts intermittently to raise liquid from the container to the distributor.

8. A refrigerating device as set forth in claim 6, in which the means operated by the changes in the pressure differential acts intermittently to raise liquid from the container to the distributor, and in which the distributor comprises a reservoir.

9. The method as set forth in claim 5, in which the substantially higher vapor pressure on the lower body of liquid is periodically maintained.

10. A device as set forth in claim 6, in which the means for raising liquid from container to distributor includes a passageway leading from the container to the distributing chamber and terminating below the liquid level in the container, and means controlled by the liquid level in the container for equalizing the pressure in the distributing chamber and the container when the liquid level has fallen a predetermined amount.

HENRY C. WILLIAMSON.